(12) United States Patent
Beringer

(10) Patent No.: US 8,122,084 B2
(45) Date of Patent: Feb. 21, 2012

(54) COLLABORATIVE CONVERSATION CHANNELS

(75) Inventor: Joerg Beringer, Frankfurt (DE)

(73) Assignee: SAP AG, Walldorf (GE)

( * ) Notice: Subject to any disclaimer, the term of this patent is extended or adjusted under 35 U.S.C. 154(b) by 1397 days.

(21) Appl. No.: 10/649,377

(22) Filed: Aug. 27, 2003

(65) Prior Publication Data

US 2004/0083265 A1 Apr. 29, 2004

Related U.S. Application Data

(60) Provisional application No. 60/422,363, filed on Oct. 29, 2002.

(51) Int. Cl.
*G06F 15/16* (2006.01)
(52) U.S. Cl. .......................... 709/204; 709/206; 715/758
(58) Field of Classification Search .................. 709/204, 709/205, 206; 715/751, 753
See application file for complete search history.

(56) References Cited

U.S. PATENT DOCUMENTS

| | | | | |
|---|---|---|---|---|
| 5,819,269 | A * | 10/1998 | Uomini | 707/7 |
| 5,884,035 | A * | 3/1999 | Butman et al. | 709/218 |
| 5,958,006 | A * | 9/1999 | Eggleston et al. | 709/206 |
| 6,014,135 | A * | 1/2000 | Fernandes | 715/744 |
| 6,020,884 | A * | 2/2000 | MacNaughton et al. | 715/747 |
| 6,029,161 | A * | 2/2000 | Lang et al. | 707/1 |
| 6,078,948 | A | 6/2000 | Podgorny et al. | |
| 6,374,290 | B1 * | 4/2002 | Scharber et al. | 709/205 |
| 6,480,885 | B1 * | 11/2002 | Olivier | 709/207 |
| 6,493,703 | B1 * | 12/2002 | Knight et al. | 709/206 |
| 6,751,657 | B1 * | 6/2004 | Zothner | 709/206 |
| 6,988,138 | B1 * | 1/2006 | Alcorn et al. | 709/204 |
| 7,028,262 | B2 * | 4/2006 | Estrada et al. | 709/204 |
| 7,039,700 | B2 * | 5/2006 | Saeidi | 709/207 |
| 7,130,885 | B2 * | 10/2006 | Chandra et al. | 709/206 |
| 7,493,396 | B2 * | 2/2009 | Alcorn et al. | 709/204 |
| 7,512,655 | B2 * | 3/2009 | Armstrong et al. | 709/206 |
| 7,548,957 | B1 * | 6/2009 | Wichmann et al. | 709/217 |
| 7,733,366 | B2 * | 6/2010 | Beavers et al. | 709/204 |
| 7,761,518 | B2 * | 7/2010 | Morin et al. | 709/206 |
| 2002/0097267 | A1 | 7/2002 | Dinan et al. | |
| 2003/0050986 | A1 * | 3/2003 | Matthews et al. | 709/206 |
| 2003/0158897 | A1 * | 8/2003 | Ben-Natan et al. | 709/204 |
| 2003/0225833 | A1 * | 12/2003 | Pilat et al. | 709/204 |

OTHER PUBLICATIONS

Kreyscher, Martin. SAP Collaboration Room (mySAP Enterprise Portal Edition), Sep. 12, 2002. SAP Design Guild. <http://www.sapdesignguild.org/editions/edition5/print_collaboration_room.asp>.*

Brinck, Tom. Groupware: Design Issues. Usability First. 1998, <http://www.usabilityfirst.com/groupware/design-issues.txl>.*

(Continued)

*Primary Examiner* — Jeffrey R Swearingen
(74) *Attorney, Agent, or Firm* — Finnegan, Henderson, Farabow, Garrett & Dunner, LLP

(57) ABSTRACT

Systems and techniques to facilitate communications among individuals in an enterprise may use collaborative conversation channels that are associated with specific communities within the enterprise. In general, in one implementation, the technique includes defining communities within an enterprise and providing access to collaborative conversation channels through a user interface. Each collaborative conversation channel is associated with a specific community and has an associated set of message types. A request to send a message of a selected message type within one of the collaborative conversation channels may be received through the user interface. In response to the request, the message may be sent through the collaborative conversation channel.

29 Claims, 3 Drawing Sheets

OTHER PUBLICATIONS

Rakotonirainy, Andry et al. "Middleware for Reactive Components: An Integrated Use of Context, Roles, and Event Based Coordination." Middleware '01: Proceedings of the IFIP/ACM International Conference on Distributed Systems Platforms Heidelberg. Springer-Verlag. Nov. 2001. 77-98.*

Coster, Rickard et al. "Inverted File Search Algorithms for Collaborative Filtering." SIGIR '02: Proceedings of the 25th annual international ACM SIGIR conference on Research and development in information retrieval. ACM Press. Aug. 2002. 246-252.*

Ferman, A. Mufit et al. "Content-Based Filtering and Personalization Using Structured Metadata." JCDL '02: Proceedings of the 2nd ACM/IEEE-CD joint conference on Digital libraries. ACM. Jul. 2002. p. 393.*

DeSanctis, Gerardine et al. "Building a Global Learning Community." Communications of the Acm. Volume 44, Issue 12. Acm Press. Dec. 2001. 80-82.*

Matthias Vering et al., Role-Based Portal to a Workplace System, U.S. Appl. No. 10/306,894, Nov. 27, 2002.

SAP White Paper, MySAP Technology, Portal Infrastructure: People-Centric Collaboration, Version 1.1, 2001.

May, "Automatic Classification of E-Mail Messages by Message Type," Journal of the American Society for Information Science, vol. 48, No. 1, 1997, pp. 32-39.

Lee et al., "Supporting Multi-User, Multi-Applet Workspaces in CBE," pp. 344-353, XP000724421 ISBN: 0-89791-765-0 (10 pages).

Communication from the European Patent Office, mailed on May 25, 2007, for related foreign application EP 03 078 296.5 (6 pages).

* cited by examiner

COLLABORATIVE CONVERSATION CHANNELS

CROSS REFERENCE TO RELATED APPLICATIONS

This application claims the benefit of priority from U.S. Provisional Application entitled "Dynamic User Segmentation Builder", filed Oct. 29, 2002, application Ser. No. 60/422,363.

BACKGROUND

The following description relates to collaboration in an enterprise, for example, the use of collaborative conversation channels to facilitate collaboration among members of a community.

Virtually every aspect of an enterprise is driven in some form by collaboration among participants to complete tasks. Many different types of collaborative structures typically exist in a work environment. Examples include personal networks, teams, departments, organizations, and business networks. Personal networks generally are based on an individual's private relationships, which he or she may use to get informal information or advice—e.g., by sending an email inquiry to a trusted colleague seeking input on an issue of concern. Teams are made up of a group of people who are organized to work together and may include ad-hoc teams, project teams (e.g., a product launch team), ongoing teams (e.g., a sales team, management team, and the like) and the like. Departments may be made up of multiple teams working together for a common goal. An organization may represent an entire company, and a business network may include members from across company boundaries (e.g., a group of trusted suppliers).

In general, the efficiency and productivity of an enterprise can be improved through the use of information sharing, communication, and coordination among individuals, members of a team, a department, an organization, or a business network. To this end, collaboration may be accomplished, for example, through meetings, websites, teleconferences, phone conversations, email exchanges, instant messaging, face-to-face discussions and the like.

SUMMARY

The present application describes systems and techniques relating to facilitating collaboration among individuals in an enterprise. The present inventors recognized that conventional communication patterns regarding many topics that may be of interest to particular individuals often are limited to personal networks. Accordingly, the inventors developed collaborative conversation channel systems and techniques that allow individuals in a community composed of members with an interest or responsibility in a particular topic to access collaborative tools through a user interface associated with the community.

In one aspect, communications among persons in an enterprise may be facilitated by defining communities within an enterprise, associating each collaborative conversation channel with a specific community, and providing access through a user interface to the collaborative conversation channels. Each collaborative conversation channel may have an associated set of message types. A request to send a message having a selected message type within one of the collaborative conversation channels may be received through the user interface, and the message may be sent through the selected collaborative conversation channel.

Implementations may include one or more of the following features. For example, members of a particular community may be identified and the identified members may be provided with access to the collaborative conversation channel that corresponds to the particular community. Each community may include members with either a common fortune or a common interest.

The collaborative conversation channels may be constructed in accordance with one or more generic channel types, such as an operational channel, a strategic channel, or an educational channel. The set of message types may include predefined message templates. Users may obtain an implicit subscription to a collaborative conversation channel by becoming a member of a community associated with the collaboritive conversation channel or based on information in each respective user's personal user profile.

Messages received through collaborative conversation channels may be filtered based on the message type. Filters may be provided for filtering messages received through a collaborative conversation channel based on a community type for a community associated with the collaborative conversation channel, a channel type for the collaborative conversation channel, and/or a community role for members of a community associated with the collaborative conversation channel. The filters may be pre-configured based on a pre-configured community and/or a pre-configured community role. Filtering of messages may be based on a user profile associated with each member of the community. Filtering parameters may be automatically associated with each member of the community based on a community type for the community, a channel type for the collaborative conversation channel, and a role of the member within the community.

A predefined set of message types may be provided based on a community type for a community associated with the collaborative conversation channel, a channel type for the collaborative conversation channel, and/or a community role for members of a community associated with the collaborative conversation channel. Users may access a community place for each community. The community place may have collaborative components that are based on a community type for the community, and access to the collaborative conversation channel may be provided through the community place.

Members of a specific community may be provided with a set of message types, which are based on a community type for the community, a channel type for the collaborative conversation channel, and a role of the member within the community.

The collaborative conversation channels may be provided through a portal accessible from client devices and may use resources provided by enterprise base systems. The enterprise base systems may include applications for facilitating communications and/or a message server. Users may be allowed to list and/or to search for available collaborative conversation channels. Communications sent by members of the community through the collaborative conversation channel may be received in a message center of the portal. Communications received in the message center may have an associated icon to indicate a message type and may include an identification of the community to which the communication relates.

The described techniques may be implemented in a system, method, or as a set of instructions stored on a machine-readable medium and operable to cause one or more machines to perform certain operations.

Advantages arising from the use of the collaborative conversation channels described here may include one or more of the following. Users may be able to more conveniently collaborate regarding a wide variety of topics. A user may be able to search for and select collaborative conversation channels based on topics that are of interest to the user. The user can then correspond with other users of the collaborative conversation channel without needing to know who is a member of the corresponding community. The collaborative conversation channel may also provide predefined message frameworks that facilitate collaboration and communication and may support filtering so that users only receive messages that are of interest or relevance to those users.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to supporting collaboration through the use of collaborative conversation channels on an enterprise portal. Collaborative conversation channels represent topic-based communication channels. Communities may be formed in an enterprise from individuals that have a common interest or play a role in particular topics. Each community may have one or more associated collaborative conversation channels that enables members of the community to send, for example, instant messages to other members of the community. Thus, each community can have its own semi-private conversation. Instant messaging provides peer to peer communication of transient messages (i.e., messages that are to be deleted after receipt by the addressee(s)). The collaborative conversation channel associated with each community represents a one to many (1:N) messaging to a targeted group of people (i.e., members of the community). Messages are classified within each collaborative conversation channel according to their context (e.g., by message type). Available message types depend on the type of community. Each community may also have an associated community place that includes collaborative components (e.g., calendar, question and answer areas, etc.) specifically designed or selected for the types of collaboration typically performed in the community. The collaborative tools may support, for example, communications, information sharing, and coordination of activities.

Figure 1:
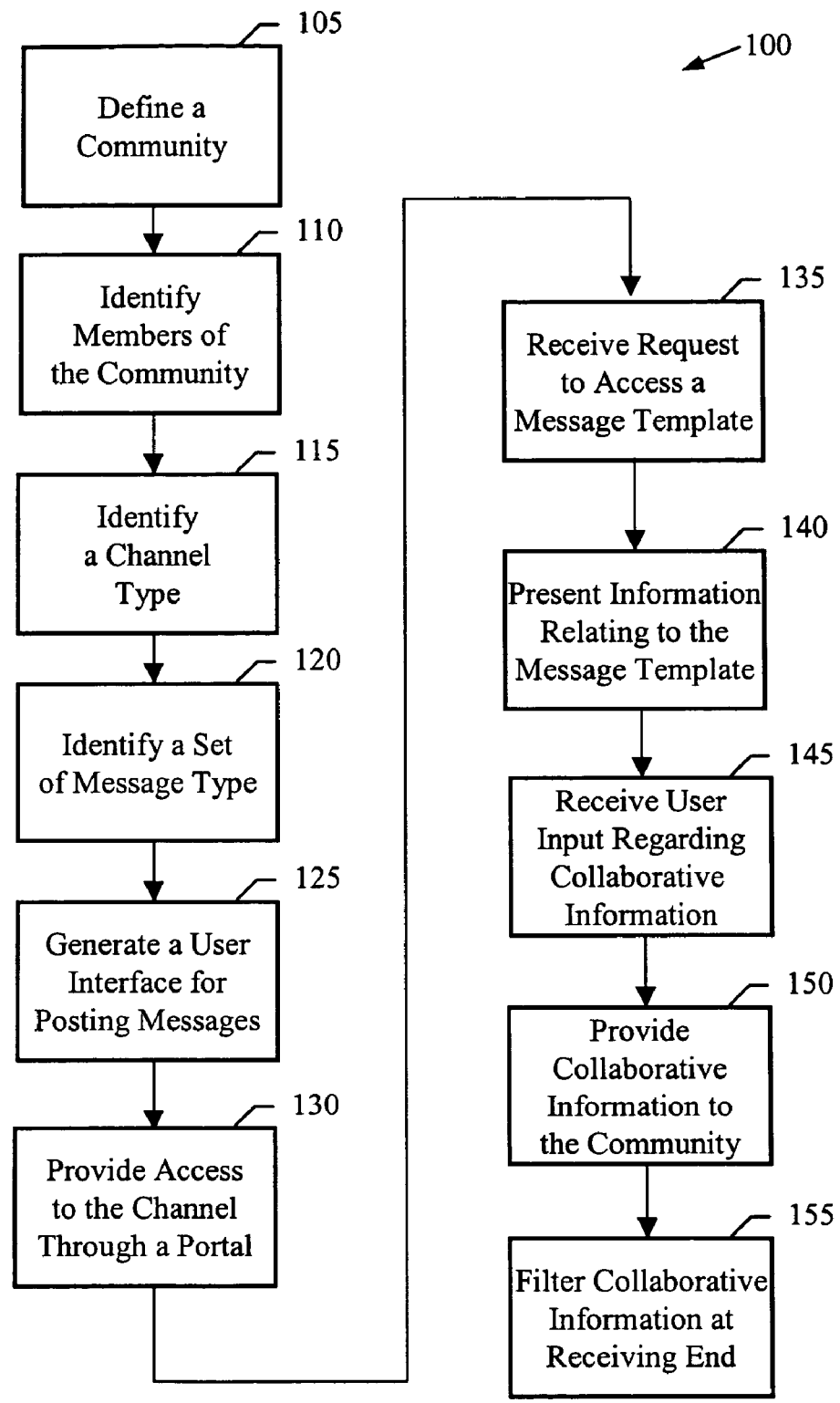
FIG. 1 is a flow diagram of a process for implementing a collaborative conversation channel.

FIG. 1 is a flow diagram of a process for implementing a collaborative conversation channel. Initially, a community is defined (step 105). Essentially, communities represent groups of individuals that have something in common, which may relate, for example, to personal interests, corporate issues, work groups, project groups, or roles. Communities may be defined, for example, by a common fortune or a common interest. Individuals may have a common fortune if they work on the same business object (e.g., a customer, product, event, process, and the like), perform the same type of activity (e.g., a controller, marketer, developer, designer, or salesperson), belong to the same group (e.g., have the same location, belong to the same team, are employees of the same organization, or are beginners), or use the same tool (e.g., a particular cell phone model or software application). Individuals may have a common interest in, for example, web technologies, Java programming, or health issues. Accordingly, a collaborative conversation channel may be defined for a particular topic that a number of individuals may have in common.

After the community is defined, the members of the community can be identified (step 110). Membership in a community may be based on a predefined group of members. Membership in a community might also be based on an individual's election to join a community. There may be a capability to list and search for communities. In another alternative, membership in a particular community can be determined automatically, for example, by a computer process executing a matching algorithm, based on whether information about an individual falls within certain parameters.

A collaborative conversation channel may be constructed for each community. Membership in a community may result in users implicitly subscribing to a collaborative conversation channel. Each collaborative conversation channel may be constructed according to one or more identified generic channel types (step 115). Different collaborative conversation channels may follow a common basic structure depending on the type of community. Generic channel types may therefore be used to provide a basic framework for specific implementations of collaborative conversation channels. Generic channel types segment a community conversation into broad categories. Message types within a channel may represent a sub-category that further categorizes the content. Generic channel types may include operational channels and strategic channels, although other generic channel types, such as educational channels, may also be provided.

Operational channels may relate to conversations or collaboration on a working level regarding daily experiences, questions and answers, coordination of work, and gossip or jokes. Operational channels are generally open to everyone in a community. Strategic channels may relate to conversations or collaboration on a more broad-based level regarding new concepts, evaluation of current processes, and/or global coordination of resources. Strategic channels may be closed to most users and accessible only by selected community members (e.g., based on the members roles). Educational channels, if included in a particular implementation, may be used to provide information about new technologies, new projects, training opportunities, changes in an enterprise, and/or the availability of new resources, although much of this information may instead be included in an operational channel.

Based on the needs of the particular community and/or the selected generic channel type, a set of message types may be identified and/or defined (step 120). Message templates, spreadsheet templates, word processing templates, and event announcement templates may be provided to support the various message types. By classifying messages according to different message types, messages may be efficiently filtered at the receiving end so that each user only receive messages that are of interest to that person or that are necessary for the particular role in which the user functions within the community. Furthermore, classifying messages by message type allows a more structured storage mechanism for the messages. For example, message archives can conveniently be searched according to message type, which allows messages to be searched more efficiently.

Different communities may require different message types depending on the type of topic on which the community is based. For example, a community that is driven by tools and methods, such as Microsoft Office, contextual design, or workbench applications, may need message types that relate to questions and problems, updates, fixes, patches, tips, how-to information, work-arounds, and training opportunities. A community that is driven by activities, such as teaching, user interaction design, or software development, may need message types that relate to best practices, standards, tools, changes, new technology, questions and solutions, training opportunities, jokes, stories, opinions, and communicating to assist in aggregating demand for resources. A community that is driven by a service offering, such as training, information technology (IT) support, or user interface design, may need message types that relate to resource coordination, changes, and feedback. A community that is driven by an interest, such as Java, product quality, or user-centered design, may need message types that relate to new information resources, opinions, experiences, insights, tips, ideas, best practices, and success stories. Accordingly, communities may be pre-configured with specific message types.

In constructing a collaborative conversation channel, a user interface for posting messages or other conversation items in the community may be generated (step 125). The user interface may include drop down menus or buttons for selecting a message type. In some cases, the user interface may differ based on the role of individual members within the community.

Once the collaborative conversation channel is constructed, access to the collaborative conversation channel may be provided through a portal (step 130). For example, a user might have his or her own home page on the portal that includes buttons, tabs, or links to different collaborative tools/message types for the various communities of which he or she is a member. Each community may have a menu of message types from which a user can select to post a message to a community. This menu of message types may be provided in a community room page. Community room pages may also provide access to an archive of messages that is structured according to message type and/or to other listings of classified messages (e.g., top ten helpful tips, then most recent announcements, etc.). Alternatively, a user may select a topic, from which the appropriate community or collaborative conversation channel can automatically be determined.

The user may navigate a particular community room page and select a button or menu item representing a message type. As a result, a request to send a message of the selected message type may be received through the portal (step 135). By selecting a message type, messages may be classified into different categories (i.e., according to whether the message is a question, an answer, an announcement, a work-around, and the like). This use of message types facilitates filtering of messages on the receiving side and provides an explicit structure for classifying messages for purposes of searching or browsing archival messages. Generally, the message types that are available for a given community reflect typical conversations for that community. In other words, each collaborative conversation channel may be pre-configured with message types that are useful or meaningful to the corresponding community. Accordingly, different collaborative conversation channels may have different pre-configured message types.

In response to a request for access to a selected message type, a corresponding message template may be presented to the user (step 140). Accordingly, the user typically would first select a community or topic and then select (e.g., using a drop down menu or button) a message type. In other implementations, it may be possible for a user to first select a message and then restrict the message to a particular collaborative conversation channel.

The message template may be presented to the user so that the user can make some type of collaborative contribution, such as sending a message or modifying shared information. The selected message template may be used to provide user input regarding collaborative information, which may be received through the portal (step 145).

The message or other collaborative information provided by the user may subsequently be provided to the community (step 150). The collaborative information may be sent, for example, through the collaborative conversation channel to a message center in the portal, within a news panel or inbox of a related community place, by email, by phone, by pager, or by short message service (SMS). Subscriptions to receive messages and other collaborative information sent through a particular collaborative communication channel may implicitly result from becoming a member of a particular community or may implicitly result from a correspondence between a topic associated with a particular community and information in a personal user profile. The message center may itself be associated with the community room page. In cases where a user is a member of multiple communities, the message center may be independent of the community so that the user can conveniently receive all messages, even including those that do not originate from a collaborative conversation channel, in a single message center. A particular user's message center may thus include emails, workflows, announcements, or any other communications coming out of a community or communities for which the user is a member. To help distinguish different messages, the message type may be indicated as an icon in the message center. In addition, to help provide context, the message center may indicate in which community the message originated (e.g., "this is a message from community _____") or otherwise group messages by type or community.

In providing collaborative information to the community, filters may be implemented to efficiently control which incoming messages are actually received at the receiving end (step 155). Filters may be automatically generated depending on one or more of the community type (e.g., whether the community relates to the same activity, such as sales or product design, or to the same tool, such as a cell phone or digital tape recorder), the channel type (e.g., operational or strategic), and the particular user's role in the community (e.g., match maker, moderator, passive guest, core member, expert, and the like). Users may also apply filters by manually selecting filter parameters.

Users in different roles within a community may have a need to see only certain message types. An expert, for example, may need to receive questions but not basic how-to information. A high level manager may be overwhelmed by all of the messages on an operational channel for a particular community and thus may only need to see messages on a strategic channel for that community. Accordingly, filter profiles may be pre-configured in connection with pre-configured roles.

Similarly, specific message types that are available for sending out collaborative information based on pre-configured community types, channel types, and roles. Thus, the message types available in one community may differ from those in another community. In addition, even within the same community, message types may differ for different channel types and different roles.

Figure 2:
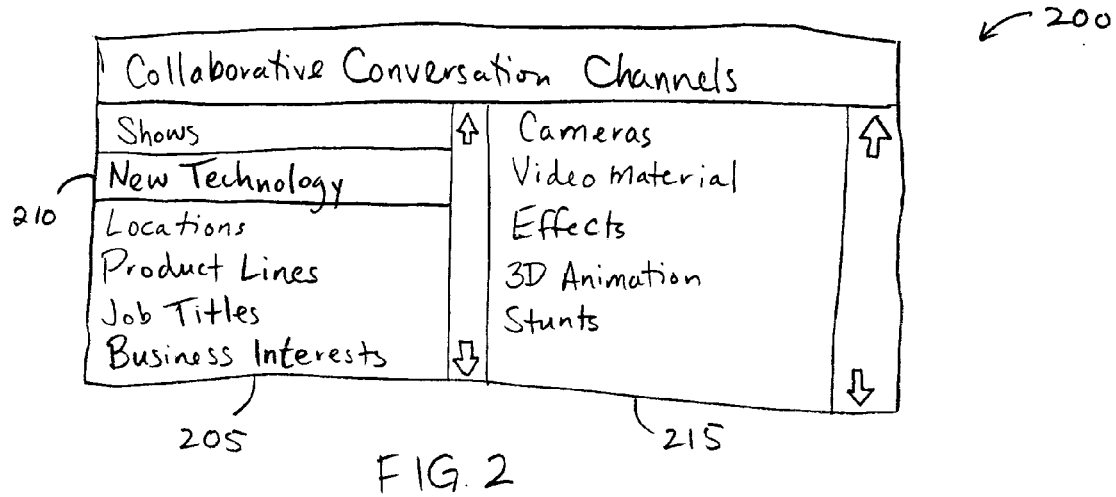
FIG. 2 is an illustrative example of a user interface window for selecting a collaborative conversation channel.

FIG. 2 is an illustrative example of a user interface window 200 for selecting a collaborative conversation channel. The user interface window 200 may be accessible through a portal, for example. A basic taxonomy area 205 provides a scrollable listing of basic categories of communities (e.g., new technology, locations, product lines, etc.). A user can select a particular basic category, which may be highlighted (as indicated at 210), and the specific communities/collaborative conversation channels for the selected category may be displayed as a scrollable list in a channel window 215. The user can then select a particular channel or community for which to create a message.

Figure 3:
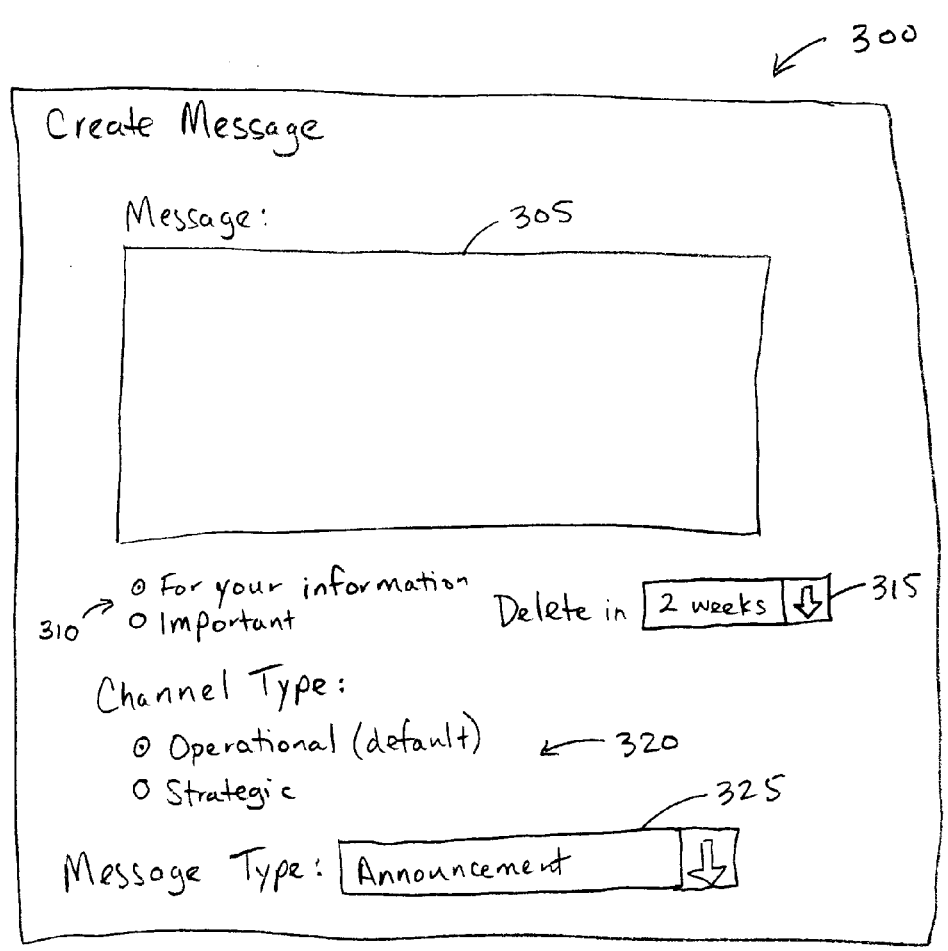
FIG. 3 is an illustrative example of a user interface window for creating a message.

FIG. 3 is an illustrative example of a user interface window 300 for creating a message. The user interface window 300 includes a field 305 for entering the text of a message. Selectable fields 310 allow the user to indicate an importance of the message. A duration field 315 allows the user to select when the message will be deleted. The user can also select the channel type (as indicated at 320), which may default to the operational channel. The user can also select the message type from a pull down menu 325. As discussed above, the listed message types for each collaborative conversation channel may be automatically generated based on a pre-configuration of the communities. In an alternative implementation, a user may first select a message type and then be presented with a template that is predefined according to the needs of that message type.

Figure 4:
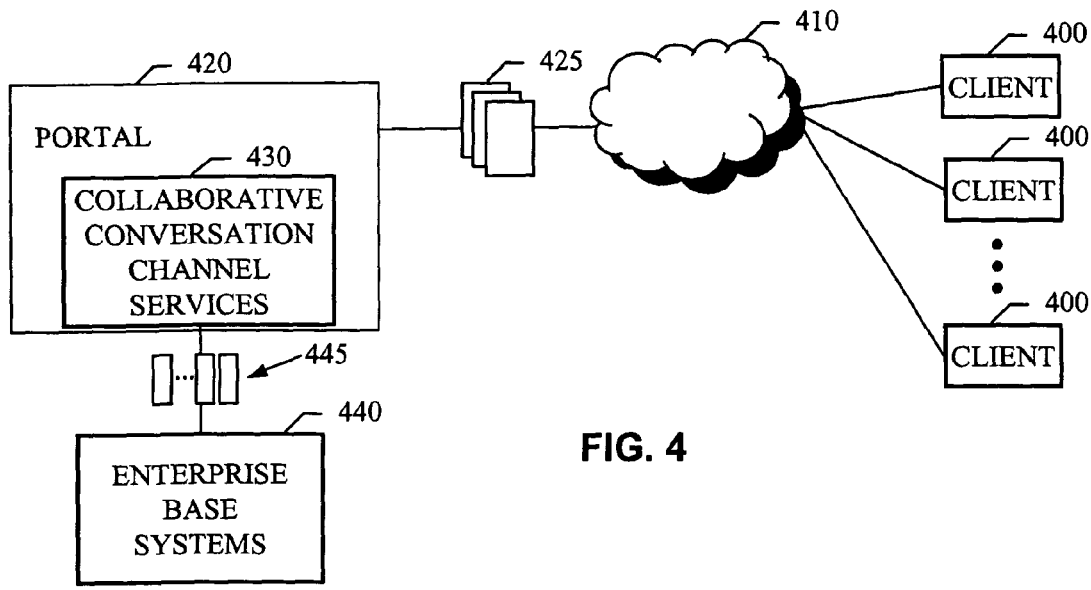
FIG. 4 is a block diagram illustrating an example collaborative conversation channel system.

FIG. 4 is a block diagram illustrating an example collaborative conversation channel system. Multiple clients 400 can access data over a network 410 through a portal 420. The network 410 can be any communication network linking machines capable of communicating using one or more networking protocols, e.g., a local area network (LAN), a wide area network (WAN), an enterprise network, a virtual private network (VPN), and/or the Internet. The clients 400 can be any machines or processes capable of communicating over the network 410. The clients 400 can be Web Browsers and optionally can be communicatively coupled with the network 410 through a proxy server (not shown).

A portal 420 provides a common interface to program management services. The portal 420 receives requests from the clients 400 and generates information views 425 (e.g., Web pages) in response. The portal 420 can implement a user roles-based system to personalize the common interface and the information views 425 for a user of a client 400. A user can have one or more associated roles that allow personalized tailoring of a presented interface through the generated information views 425.

The portal 420 includes a collaborative conversation channel system 430 that consolidates collaborative conversation channels for a variety of different topics. The portal 420 allows users to access the collaborative conversation channels (e.g., through a community place) and to select among available message types through requests from the clients 400. The collaborative conversation channel system 430 can provide templates for the various message types and can support the filtering functionalities described above. In addition, the collaborative conversation channel system 430 may also support pre-configured communities and pre-configured roles that have predefined filters and message types based on community type, channel type, and community role.

The portal 420 and the collaborative conversation channel system 430 communicate, through any intervening management systems (not shown), with enterprise base systems 440 to access underlying applications and to obtain multiple types of data 445. The enterprise base systems 440 can include various existing application services, such as human resource management systems, customer relationship management systems, financial management systems, project management systems, knowledge management systems, business warehouse systems, time management systems, and electronic file and/or mail systems, including a message server. The enterprise base systems 440 also can include an integration tool, such as the eXchange Infrastructure provided by SAP, that provides another level of integration among base systems. The collaborative conversation channel system 430 can use the enterprise base systems 440 to support the various message types in one or more collaborative conversation channels.

The portal 420, enterprise management system 430 and enterprise base systems 440 can reside in one or more programmable machines, which can communicate over a network or one or more communication busses. For example, the base systems 440 can reside in multiple servers connected to an enterprise network, and the portal 420 and the enterprise management system 430 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 5:
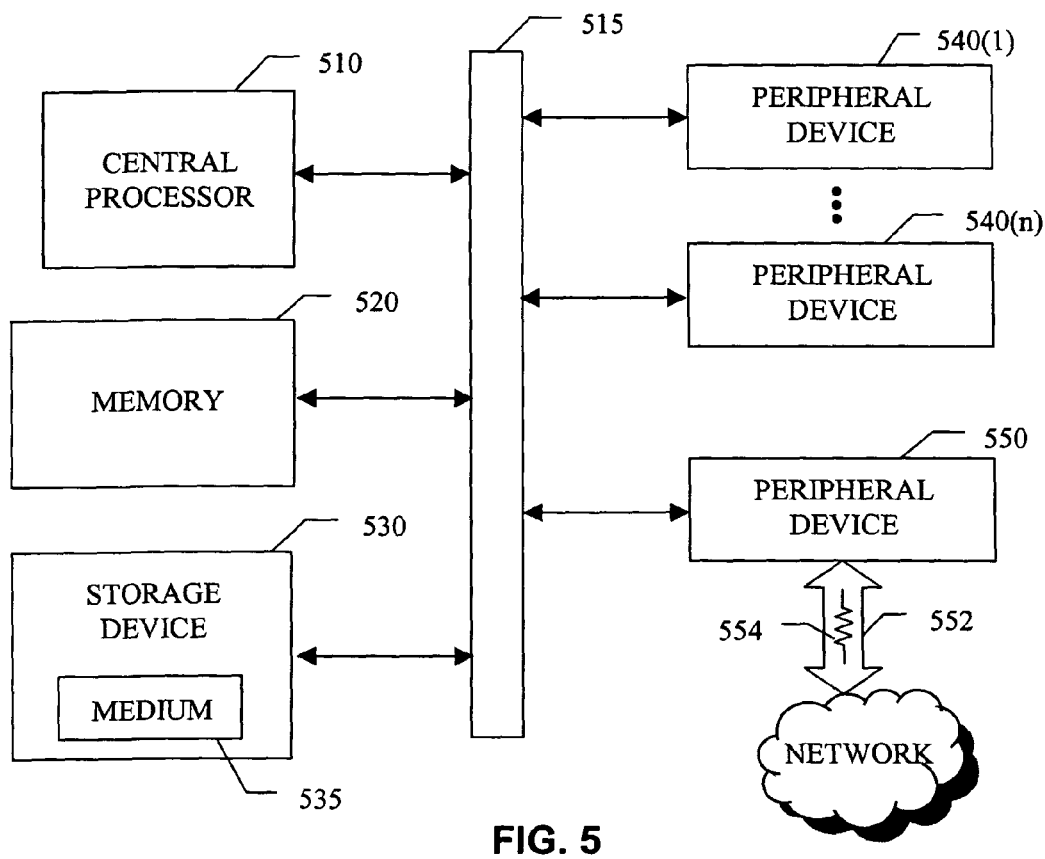
FIG. 5 is a block diagram illustrating an example data processing system in which a collaborative conversation channel system may be implemented.

FIG. 5 is a block diagram illustrating an example data processing system 500 in which a collaborative conversation channel system may be implemented. The data processing system 500 includes a central processor 510, which executes programs, performs data manipulations and controls tasks in the system 500. The central processor 510 is coupled with a bus 515 that can include multiple busses, which may be parallel and/or serial busses.

The data processing system 500 includes a memory 520, which can be volatile and/or non-volatile memory, and is coupled with the communications bus 515. The system 500 can also include one or more cache memories. The data processing system 500 can include a storage device 530 for accessing a storage medium 535, which may be removable, read-only, or read/write media and may be magnetic-based, optical-based, semiconductor-based media, or a combination of these. The data processing system 500 can also include one or more peripheral devices 540(1)-540(n) (collectively, devices 540), and one or more controllers and/or adapters for providing interface functions.

The system 500 can further include a communication interface 550, which allows software and data to be transferred, in the form of signals 554 over a channel 552, between the system 500 and external devices, networks or information sources. The signals 554 can embody instructions for causing the system 500 to perform operations. The system 500 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 500 and/or delivered to the machine 500 over a communication interface. These instructions, when executed, enable the machine 500 to perform the features and function described above. These instructions represent controllers of the machine 500 and can be implemented in a high-level procedural and/or object-oriented programming language, and/or in assembly/machine language. Such languages can be compiled and/or interpreted languages.

As used herein, the term "machine-readable medium" refers to any computer program product, apparatus and/or device used to provide machine instructions and/or data to the machine 500, including a machine-readable medium that receives machine instructions as a machine-readable signal. Examples of a machine-readable medium include the storage medium 535, the memory 520, and/or PLDs, FPGAs, ASICs, and the like. The term "machine-readable signal" refers to any signal, such as the signals 554, used to provide machine instructions and/or data to the machine 500.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss particular types of communities and collaborative tools, although the systems and techniques disclosed herein may be used in connection with other types of communities and collaborative tools. The logic flow depicted in FIG. 1 does not require the particular order shown, or sequential order, to achieve desirable results. For example, various process steps may be performed at many different places within the overall process. In certain implementations, multitasking and parallel processing may be preferable.

Other embodiments may be within the scope of the following claims.

What is claimed is:

1. A method for facilitating communications in an enterprise using a processor, the method comprising:
   defining communities within the enterprise;
   associating collaborative conversation channels with the communities wherein the collaborative conversation channels are respectively associated with specific ones of the defined communities;
   providing a member of a specific one of the defined communities with access to the respective one of the collaborative conversation channels through a user interface, with each one of the collaborative conversation channels having an associated set of message types that is based on a topic of the specific one of the defined communities and a role of the member within the specific one of the defined communities, the associated set of message types corresponding to a plurality of different message templates;
   receiving, through the user interface, a request to send a message having a selected message type within a selected one of the collaborative conversation channels, wherein the selected message type is selected at the user interface;
   presenting one of the message templates that corresponds to the selected message type;
   filtering the message according to the selected message type and according to filter profiles corresponding to the role of the member; and
   sending the message having the selected message type through the selected one of the collaborative conversation channels.

2. The method of claim 1 further comprising:
   identifying members of a specific community; and
   providing the identified members with access to one of the collaborative conversation channels that corresponds to the particular community.

3. The method of claim 1 wherein each one of the defined communities includes members with one of a common fortune or a common interest.

4. The method of claim 1 further comprising constructing the collaborative conversation channels in accordance with at least one generic channel type.

5. The method of claim 4 wherein the generic channel type is selected from a group consisting of an operational channel, a strategic channel, and an educational channel.

6. The method of claim 1 wherein the set of message types includes predefined message templates.

7. The method of claim 1 wherein users obtain an implicit subscription to a collaborative conversation channel by becoming a member of one of the defined communities associated with one of the collaborative conversation channels.

8. The method of claim 1 wherein users obtain an implicit subscription to one of the collaborative conversation channels based on information in personal user profiles.

9. The method of claim 1 further comprising providing filters for filtering the message received through one of the collaborative conversation channels based on at least one of a community type for one of the defined communities associated with one of the collaborative conversation channels and a channel type for one of the collaborative conversation channels.

10. The method of claim 9 wherein the filters are pre-configured based on a pre-configured community.

11. The method of claim 1 further comprising providing a predefined set of message types based on at least one of a community type for one of the defined communities associated with one of the collaborative conversation channels, a channel type for one of the collaborative conversation channels, and a community role for members of one of the defined communities associated with one of the collaborative conversation channels.

12. The method of claim 1 further comprising providing access to a community place for each one of the defined communities having collaborative components that are based on a community type for each one of the defined communities, wherein access to one of the collaborative conversation channels is provided through the community place.

13. A system, including a memory and at least one processor, for supporting collaboration in an enterprise, the system comprising:
- a portal accessible from a plurality of client devices;
- a plurality of enterprise base systems; and
- a collaborative conversation channel application, running on the processor, for providing members of a community with access through the portal to a plurality of different message templates for a collaborative conversation channel associated with the community, wherein the community relates to a particular topic, and the application:
  - receives a member selection of a message type associated with the particular topic and a role of the member within the community;
  - presents one of the message templates that corresponds to the selected message type; and
  - sends a message having the selected message type to the members of the community,
  - wherein the message is filtered according to the selected message type and according to filter profiles corresponding to the role of the member within the community.

14. The system of claim 13 wherein the enterprise base systems comprise applications for facilitating communications.

15. The system of claim 14 wherein the enterprise base systems include a message server for sending messages to the community through the collaborative conversation channel.

16. The system of claim 13 wherein the collaborative conversation channel application allows users to list a plurality of available collaborative conversation channels.

17. The system of claim 13 wherein the collaborative conversation channel application allows users to search for a collaborative conversation channel.

18. The system of claim 13 wherein the collaborative conversation channel application provides a user interface for display on the client devices.

19. The system of claim 13 wherein messages sent through the collaborative conversation channel are received by members of the community in a message center of the portal.

20. The system of claim 19 wherein messages received in the message center have an associated icon to indicate the message type.

21. The system of claim 19 wherein each message received in the message center includes an identification of the community to which the message relates.

22. The system of claim 13 wherein the collaborative conversation channel filters the sending of messages to each member of the community based on a community type.

23. A non-transitory computer-readable medium storing a computer-executable program which, when executed by a processor, performs a method comprising:
- providing a member of a community with access to collaborative conversation channels through a user interface, each one of the collaborative conversation channels associated with a specific community and having an associated set of message types that is based on a topic of the specific community and a role of the member within the specific community, the associated set of message types corresponding to a plurality of different message templates;
- receiving, through the user interface, a request to access one of the message templates for a selected message type within one of the collaborative conversation channels, wherein the selected message type is selected at the user interface and the message is filtered according to the selected message type and according to filter profiles corresponding to the role of the member within the specific community;
- presenting the template for the selected message type through the user interface;
- receiving user input for the template through the user interface to create a message of the selected message type; and
- providing the message to a particular community through the associated collaborative conversation channel.

24. The non-transitory computer-readable medium of claim 23 wherein filtering of messages is further based on a community type of the particular community.

25. A method for facilitating communications in an enterprise using a processor, the method comprising:
- defining communities within the enterprise;
- associating collaborative conversation channels with the communities, with the collaborative conversation channels respectively associated with specific ones of the defined communities;
- assigning a set of message types to each one of the collaborative conversation channels, the set of message types corresponding to a plurality of different message templates;
- receiving a community member selection of a specific message type for a selected collaborative conversation channel, the specific message type being based on a topic of the specific community and a role of the community member within the specific community;
- presenting one of the message templates that corresponds to the selected message type;
- receiving user input comprising content of a message of the selected message type;
- filtering the message according to the selected message type and according to filter profiles corresponding to the role of the community member within the specific community; and
- sending the message to at least one member of the specific community associated with the selected collaborative conversation channel.

26. The method of claim 25 wherein filtering the message is further based on a user profile associated with each of the members.

27. The method of claim 25 further comprising automatically associating filtering parameters with each of the members based on a community type for each one of the defined communities and a channel type for each one of the collaborative conversation channels.

28. The method of claim 27 wherein each one of the collaborative conversation channels comprises one of an operational channel and a strategic channel.

29. The method of claim 25 further comprising providing the members of the specific community with the set of message types, wherein the message types in the set are based on a community type for each one of the defined communities, a channel type for each one of the collaborative conversation channels, and a role of the member within each one of the defined communities.

* * * * *